(12) United States Patent
Seay

(10) Patent No.: US 8,020,517 B2
(45) Date of Patent: Sep. 20, 2011

(54) INTEGRATED SYSTEM FOR TRANSPORTING LIVE POULTRY

(75) Inventor: William Jackson Seay, Metter, GA (US)

(73) Assignee: W. A. Crider, Jr., Stillmore, GA (US)

( * ) Notice: Subject to any disclaimer, the term of this patent is extended or adjusted under 35 U.S.C. 154(b) by 566 days.

(21) Appl. No.: 11/729,447

(22) Filed: Mar. 29, 2007

(65) Prior Publication Data

US 2008/0236508 A1 Oct. 2, 2008

(51) Int. Cl.
*A01K 31/07* (2006.01)

(52) U.S. Cl. ........ 119/455; 119/453; 119/489; 119/481; 220/4.32

(58) Field of Classification Search ............. 119/400, 119/401, 453, 455, 474, 481, 487, 489, 490–494, 119/843, 844; 414/809; 220/6, 4.28
See application file for complete search history.

(56) References Cited

U.S. PATENT DOCUMENTS

| | | | | |
|---|---|---|---|---|
| 1,576,330 A * | 3/1926 | Kamerer | | 119/492 |
| 1,694,732 A * | 12/1928 | Cohen | | 119/401 |
| 2,549,013 A * | 4/1951 | Robles et al. | | 220/4.31 |
| 3,234,908 A * | 2/1966 | Doskocil | | 119/496 |
| 3,292,581 A * | 12/1966 | Van Nest | | 119/453 |
| 3,346,136 A * | 10/1967 | Osborn | | 217/12 R |
| 3,476,084 A * | 11/1969 | Nater et al. | | 119/401 |
| 3,621,818 A * | 11/1971 | Johnston et al. | | 119/402 |
| 3,754,676 A * | 8/1973 | Box | | 220/324 |
| 3,952,703 A * | 4/1976 | Erfeling | | 119/453 |
| 4,084,714 A * | 4/1978 | Williams | | 414/498 |
| 4,238,044 A * | 12/1980 | Roddier | | 220/4.28 |
| 4,285,299 A * | 8/1981 | Thomas | | 119/453 |
| 5,161,709 A * | 11/1992 | Oestreich, Jr. | | 220/6 |
| 5,192,176 A * | 3/1993 | Roberts | | 410/140 |
| 5,253,763 A * | 10/1993 | Kirkley et al. | | 206/600 |
| 5,467,885 A * | 11/1995 | Blinstrub | | 220/6 |
| 5,596,950 A * | 1/1997 | Briggs et al. | | 119/489 |
| 5,913,286 A * | 6/1999 | Showalter | | 119/843 |
| 5,967,090 A * | 10/1999 | Hui | | 119/497 |
| 7,214,014 B2 * | 5/2007 | Stanley | | 410/97 |
| 7,389,745 B2 * | 6/2008 | Weaver | | 119/440 |
| 2002/0108950 A1 * | 8/2002 | Moorman et al. | | 220/7 |
| 2007/0227460 A1 * | 10/2007 | Lynch | | 119/455 |

* cited by examiner

*Primary Examiner* — Rob Swiatek
*Assistant Examiner* — Danielle Clerkley
(74) *Attorney, Agent, or Firm* — Troutman Sanders LLP; James E. Schutz; Robert R. Elliott, Jr.

(57) ABSTRACT

Disclosed herein is a poultry cage transportation assembly including: a plurality of improved poultry cages including: a floor panel; a wall frame connected to the floor panel with an tongue and groove fastener; a protrusion disposed on an edge portion of the wall frame; and a mechanical fastener operable for securing adjacent wall frames, wherein the floor panel, the wall frame, and the protrusions are constructed of unitary a durable polymer material; a light-weight trailer; and a binding system designed to secure the plurality of improved poultry cages to the light weight trailer.

9 Claims, 16 Drawing Sheets

INTEGRATED SYSTEM FOR TRANSPORTING LIVE POULTRY

FIELD OF THE INVENTION

The present invention relates generally to a system and method for transporting live poultry, which increases the transportation payload of the trailer.

BACKGROUND

The U.S. Poultry industry grows their chickens in large houses or barns until the chickens reach market age and then transport the live birds to a slaughter plant by the means of cages on a flat bed trailer. Typical poultry cages are designed to be handled with fork lifts and dumped mechanically at the slaughter plant. The current system of transportation evolved over approximately 25 years ago and has changed very little over time. One of the problems with the current system is the tractor, trailer, cages and binding mechanism weigh approximately 48,000 pounds empty allowing a payload of only 31,000 pounds of live chickens.

STATE OF THE ART TRANSPORT CAGE

Currently, the industry standard for transporting live poultry is an all metal cage with two forklift sleeves separated with angle stretchers to form a rectangular base for the cage. The all metal cage is constructed of square tubular posts, which are welded to each side of a base to segment the frame into compartment stacks. Horizontal square tubing is then positioned between the vertical post both longitudinal and transverse to provide support beams for the compartment floors. Additionally, a single sheet of fiberglass or un-reinforced plastic is positioned on the horizontal beams, which provide flooring for the compartments on each level.

The cage roof is constructed from a single panel of galvanized sheet metal welded to the square tubing frame located around the perimeter of the top of the compartments. The galvanized panel over time tends to erode leaving a rusty roof, which is a dark surface that acts as a heat sink in the summer sun. The galvanized sheet metal roof may cause heat to be radiated to the birds in the top compartments, which can result in their suffering and death.

The birds are retained in the individual compartments by wall panels constructed from small vertical wires secured by larger horizontal wires welded at crossing tangents at the top, bottom and mid point of the panels to form a grid. The frame panels are welded to the inside of the structural tubular frame. Frequent damage occurs when the forklift tines impact the wire grid panel and broken wires can be pushed inward causing injury to the birds until the panels are repaired. Typically, the panels are not repaired or replaced unless the birds are able to leave the cage through the damaged opening.

The door panels are extruded aluminum with round solid tubular like profiles incorporated in the top and bottom of the profile and extending longitudinally from one extremity to the other. The doors are rotationally mounted to the square tubular cage frame with steel pins extending from the tubular profile incorporated in the door panel. The pins are designed to extend beyond the door a sufficient amount to protrude into the slightly larger holes in the vertical frame tubing located on each horizontal extremity of the door. A steel band circling the pin and positioned between the door and the post keeps the door from sliding horizontally a sufficient amount to exit the mounting hole in the vertical post.

The position of the door is controlled by a spring loaded mechanism, which consist of a bracket rigidly mounted to the door's far side extremity, to which is rotationally mounted a rod. The rotationally mounted rod protrudes through a slot in a bracket rigidly mounted to the inside face of one of the cage's adjacent tubular post. A spring is circumferentially positioned around the control rod and placed between the door bracket and the cage mounted bracket. The spring is mounted so the spring is loaded at the mid point of the door's rotation and is relaxed as the pivot goes over center to close or open the door.

When accidentally struck by forklift tines the aluminum door stays permanently bent. The bend in the door causes the mounting pin to jam in the receiving post and the control rod in its mounting. This causes the door to be fixed in the partially open position. The partially open doors are frequently torn loose during the close side-by-side loading on the transport trailer or unloading system. It is common practice to remove the door if repair is extensive and leave the compartment without a door and therefore an un-productive compartment.

Currently, metal cages weigh in excess of 880 pounds per cage. A truck carrying a normal load of 22 empty cages would include approximately nine tons of metal cages. The weight of the metal cages adds significantly to the transportation fuel cost for shipping poultry. Additionally transportation costs associated with shipping the empty metal cages are incurred with each poultry shipment because the poultry is typically only transported one way.

Therefore what is needed is a trailer, cage and binding system that would be lighter in weight and be able to haul more pounds of live chickens, thus reducing the number of loads to move live poultry from the farms to the slaughter plants. If the weight of tractor, trailer, cages and binder could be reduced to 34,000 pounds, then the payload could be increased to 45,000 pounds rather than the 31,000 pounds as experienced today.

Since it is not feasible to reduce the tractor/trailer or the load of cages singularly by 11,000 pounds and maintain functionality and durability, an integrated transport system including a trailer designed expressly for transporting lightweight transport cages supported by an aluminum forklift pallet with integrated aluminum frame and light-weight binding is needed.

SUMMARY

Disclosed herein is an improved poultry cage that includes a plastic compartment module comprised of a floor panel and four wall frames connected to the floor panel and to each other with tongue and groove profiles. The assembled compartment is secured together with staples or other mechanical fasteners or adhesive. A polymer door is secured to the floor with a hinge that is fastened to the door and floor with a break-a-way fastener such as a soft metal rivet or other mechanical fastener such as nut and bolt or adhesive.

The binding method described herein proposes to replace the conventional binding device consisting of a spring loaded rod with end hook that is inserted into a channel bracket welded to the cage's mid structure. The spring loaded rod is attached to an over-center metal toggle, which incorporates on its other extremity a metal chain terminated with a hook. The binding to the trailer is accomplished by fastening the chain hook to the trailer rub rail and the metal hook to the cage bracket and compressing the hook spring with the over-center toggle. This method has two serious negative factors. The operator must relieve the spring loaded toggle handle which can and has caused serious injury. And in a truck roll-over the hook-spring is insufficient to prevent the over-center toggle to remain secure.

Also disclosed herein is a poultry cage transportation assembly including: a plurality of improved poultry cages including: a floor panel; a wall frame connected to the floor panel with an tongue and groove fastener; a protrusion disposed on an edge portion of the wall frame; and a mechanical fastener operable for securing adjacent wall frames, wherein the floor panel, the wall frame, and the protrusions are constructed of unitary a durable polymer material; a light-weight trailer; and a binding system designed to secure the plurality of improved poultry cages to the light weight trailer.

These and other objects, features and advantages of the present invention will become more apparent upon reading the following specification in conjunction with the accompanying drawing figures.

BRIEF DESCRIPTION OF DRAWINGS

The following drawings are part of the present specifications and are included to further demonstrate certain aspects of the invention. The invention may be better understood by reference to one or more of these drawings in combination with the detailed description of the specific embodiments presented herein.

Figure 1:
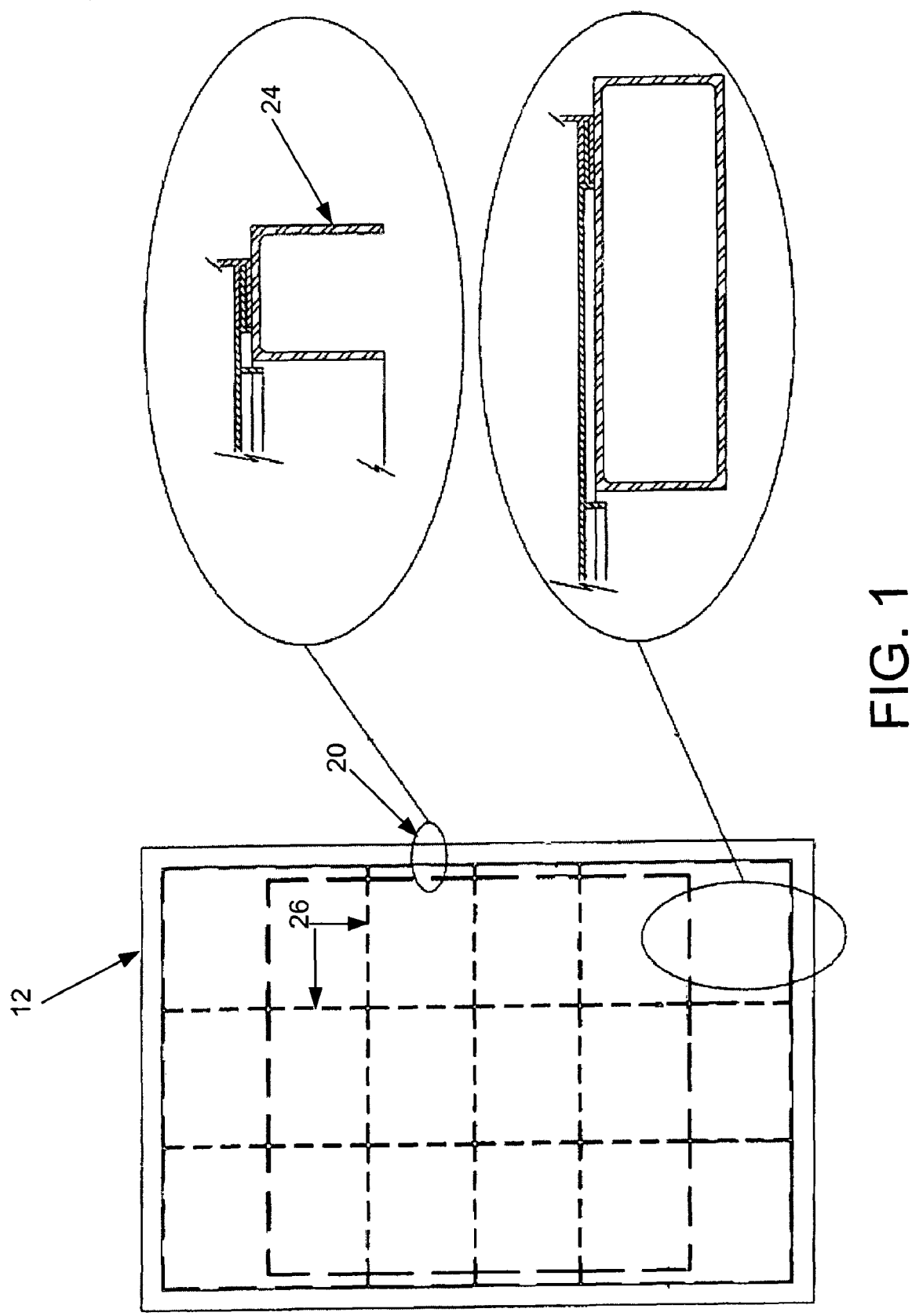
FIG. 1 illustrates a floor panel for an improved poultry cage in accordance with an exemplary embodiment of the invention.

The detailed description explains the preferred embodiments of the invention, together with advantages and features, by way of example with reference to the drawings.

DETAILED DESCRIPTION

Referring now to the figures, wherein like reference numerals represent like parts throughout the several views, exemplary embodiments of the present invention will be described in detail. Throughout this description, various components may be identified having specific values, these values are provided as exemplary embodiments and should not be limiting of various concepts of the present invention as many comparable sizes and/or values may be implemented.

FIGS. 1-5 illustrate un-assembled components of an improved poultry cage that is generally referred to as 10. The improved poultry cage 10 includes a floor panel 12, shown in detail in FIG. 1, which is connected to one or more side wall panels 14, shown in detail in FIG. 2. The floor panel 12 is also connected to a rear wall panel 16, shown in detail in FIG. 3, and a door frame panel 18, shown in detail in FIG. 4. In one embodiment, the floor panel 12, the side wall panel 14, the rear wall panel 16, and the door frame panel 18 are formed of a suitable durable polymer e.g., plastic such as poly-carbonate, polymethyl methacrylate, polyesters, polyolefins (e.g., polypropylene and polyethylene), polystyrene, or the like. The suitable durable polymer should be both light weight and durable to facilitate the transport and reuse of the improved poultry cage 10. In one embodiment of the present invention, the side wall panels 14, the rear wall panel 16, and the door frame panel 18 include a protrusion 20 disposed on their outer vertical surfaces. The protrusions 20 on each panel are designed to be fastened to an adjacent protrusion 20 and may be secured to adjacent protrusions with a mechanical fastener. In exemplary embodiments, the mechanical fastener may be a metal rivet, a plastic rivet, a staple, or the like.

In one embodiment of the present invention, the floor panel 12, the side wall panel 14, the rear wall panel 16, and the door frame panel 18 are affixed to one another using a tongue and groove connection system. For example, the outer edges of the floor panel 12 may include grooves and the lower horizontal surfaces of the side wall panels 14, the rear wall panel 16, and the door frame panel 18 include tongues that are designed to fit into the grooves.

Referring now to FIGS. 1-4 in more detail, FIG. 1 illustrates the floor panel 12 with tongue profile 24 disposed around the perimeter of the floor panel 12. The floor panel 12 also includes longitudinal and transverse reinforcing ribs 26 to provide enhanced structural integrity to the floor panel 12. In exemplary embodiments, the floor panel 12 may be molded of a high impact polymer such as polypropylene, polycarbonate, ABS, or the like. Longitudinal and traverse reinforcing ribs of two depths may be used in the floor panel 12. The shallow ribs provide uniform strength and the deeper ribs provide perimeter strength and interlock compartments to the pallet structure. The poultry cages 10 are interlocked to each other in a stack by interlocking the deep floor ribs inside the adjacent poultry cages 10.

Figure 2:
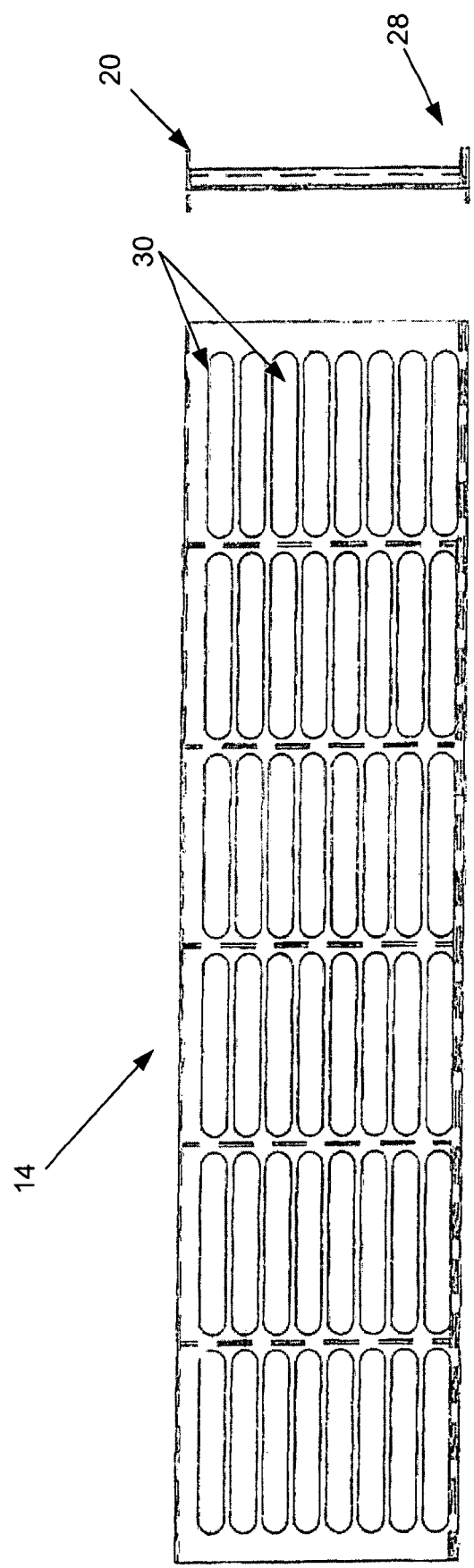
FIG. 2 illustrates a side wall panel for an improved poultry cage in accordance with an exemplary embodiment of the invention.

FIG. 2 illustrates a side wall panel 14 with a groove receiver 28 disposed on the bottom and vertical extremities of the side wall panel 14. The groove receiver 28 is designed to receive the tongue profile 24 of the floor panel 12. The side wall panel 14 also includes protrusion 20 at the top of the side wall panel 14 and perpendicular to the longitudinal face of the side wall panel 14. The side wall panel 14 panel is perforated with a plurality of generally rectangular windows 30. The narrow panel between the windows incorporates a perpendicular rib on the back side of the side wall panel 14 to improve the structural integrity of the side wall panel 14. The rib helps prevent bowing of the side wall panel 14 under stress. In exemplary embodiments, the side wall panel 14 may be molded of a high impact polymer such as polypropylene, polycarbonate, ABS, or the like.

Figure 3:
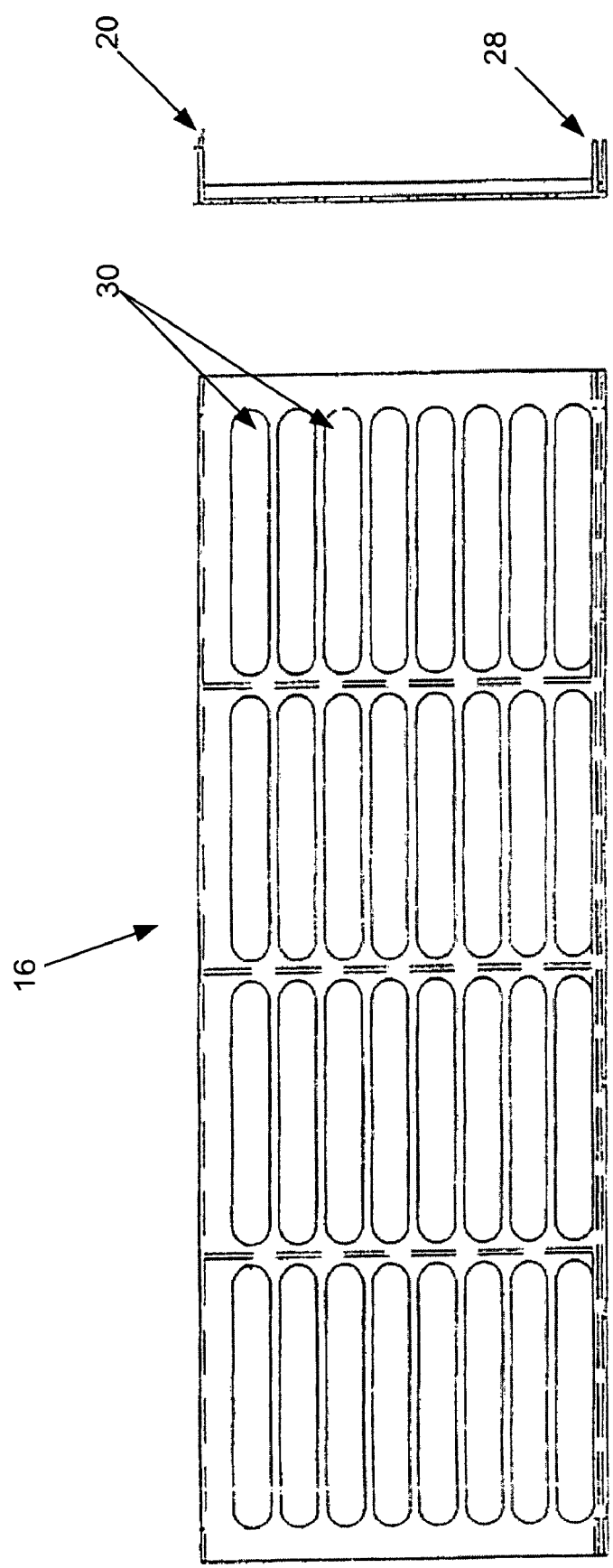
FIG. 3 a rear wall panel for an improved poultry cage in accordance with an exemplary embodiment of the invention.
Figure 4:
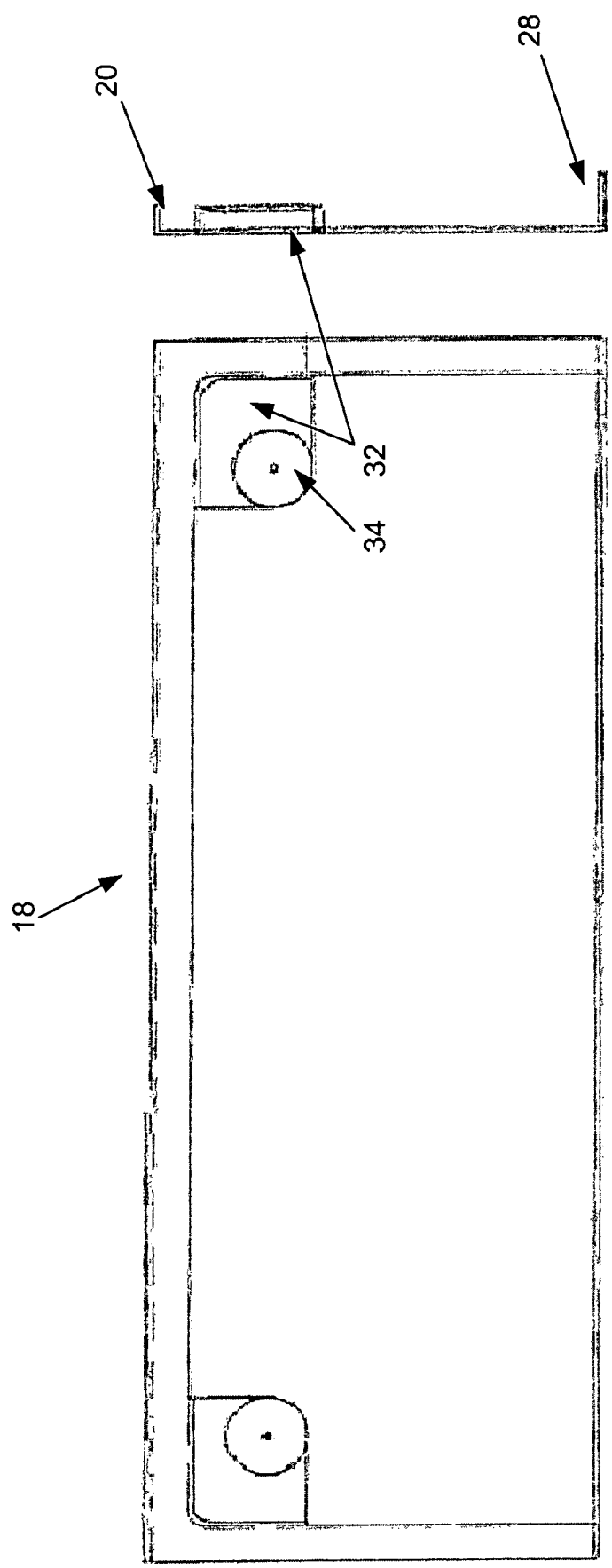
FIG. 4 illustrates a door frame panel of an improved poultry cage in accordance with an exemplary embodiment of the invention.

FIG. 3 illustrates the rear wall panel 16, which is similar in configuration to the side wall panel described with reference to FIG. 2. The rear wall panel 16 includes a similar window 30 configuration, groove receiver 28, and protrusion 20 as the side wall panel 14. The rear wall panel 16 has flat planer edges on the vertical extremities, which provide a tongue for the groove receiver 28 of the side wall panel 14. The rear wall panel 16 when assembled to the floor panel 12 and the side wall panels 14 are secured into place with mechanical fasteners, such a staples, screws, rivets, or adhesive. The rear wall panel 16 may be molded of a high impact polymer such as polypropylene, polycarbonate, ABS, or the like.

FIG. 2 illustrates a side wall panel 14 with a groove receiver 28 disposed on the bottom and vertical extremities of the side wall panel 14. The groove receiver 28 is designed to receive the tongue profile 24 of the floor panel 12. The side wall panel 14 also includes protrusion 20 at the top of the side wall panel 14 and perpendicular to the longitudinal face of the side wall panel 14. The side wall panel 14 panel is perforated with a plurality of generally rectangular windows 30, or air vents, operable for increasing the air flow in the poultry cages 10. The narrow panel between the windows incorporates a perpendicular rib on the back side of the side wall panel 14 to improve the structural integrity of the side wall panel 14. The rib helps prevent bowing of the side wall panel 14 under stress. In exemplary embodiments, the side wall panel 14 may be molded of a high impact polymer such as polypropylene, polycarbonate, ABS, or the like.

Figure 5:
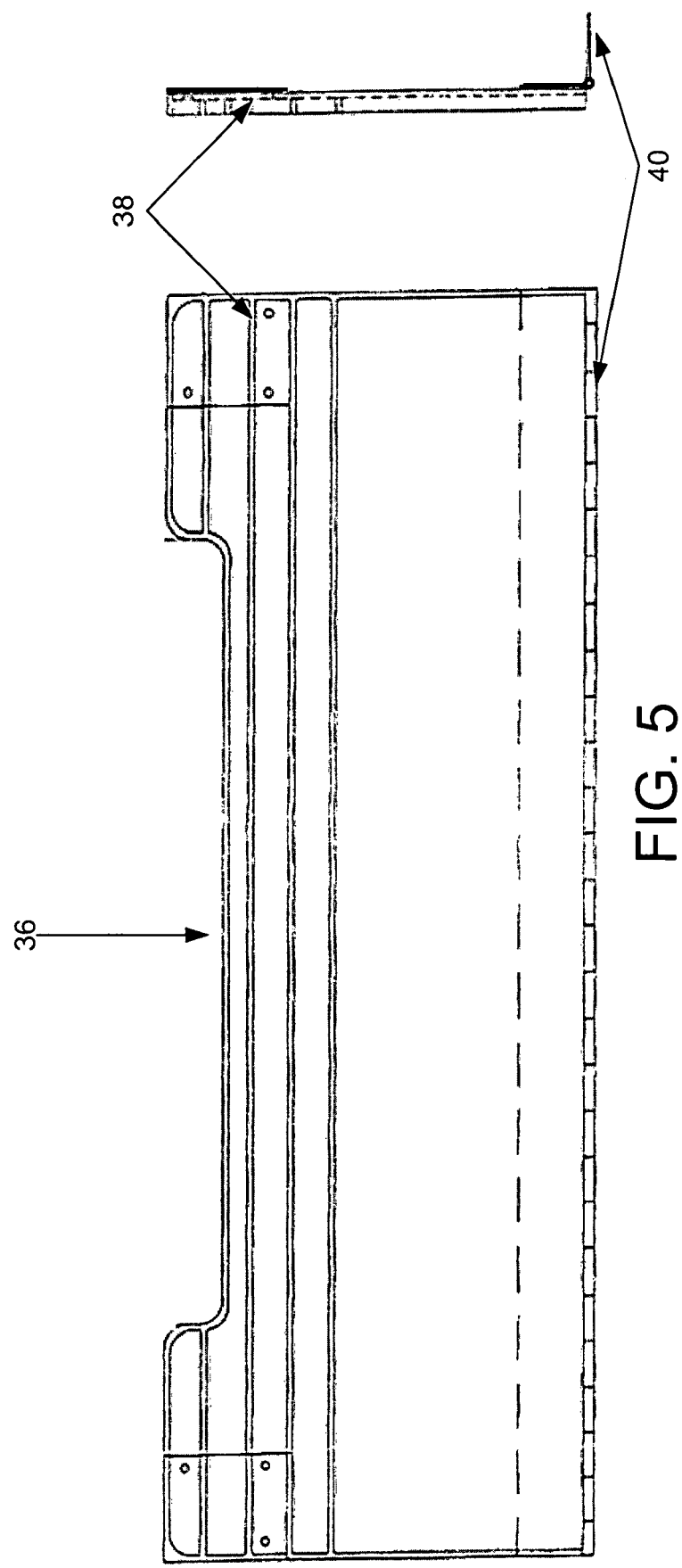
FIG. 5 illustrates a door of an improved poultry cage in accordance with an exemplary embodiment of the invention.

FIG. 5 illustrates the door 36, which includes a magnetically attractive plate 38 that is disposed on the upper extremities of the door 36. The door 36 also includes a metal hinge 40 that is disposed on the lower longitudinal plane of the door 36 and is also affixed to the floor panel 12 by mechanical fasteners. The hinge 40 is mounted to the door 36 and the floor panel 12 in a manner that the hinge knuckle is on the underside to prevent obstructing the removal of poultry when the assembled cage. The mechanical fasteners used to secure the hinge 40 are designed to break-a-way under stress to prevent damage to the door 36 or the floor panel 12. The door 36 includes a series of longitudinal ribs at the top extremity that increases the structural integrity of the door 36 and reduces bowing of the door 36 under stress. The upper corners of the door 38 include magnetically attractive plates 38 that are designed to align with the magnet 34 when the door is in a closed position. The attractive force between the magnetically attractive plate 38 and the magnet 34 is designed to be overcome by the weight of a plurality of birds pressing against the door 36 when the cage 10 is in a tilted position.

Figure 6:
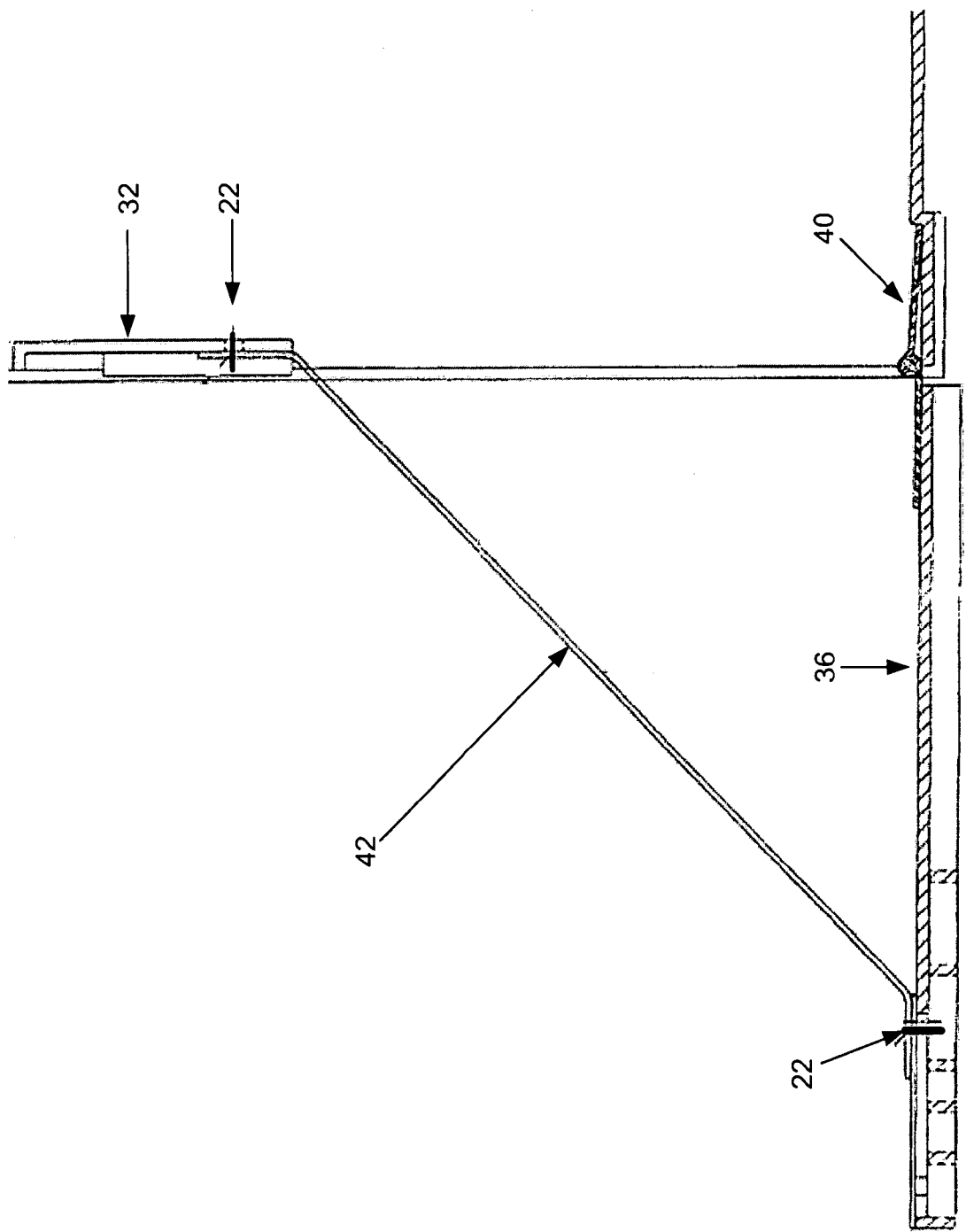
FIG. 6 illustrates a control strap of an improved poultry cage assembly in accordance with an exemplary embodiment of the invention.
Figure 7:
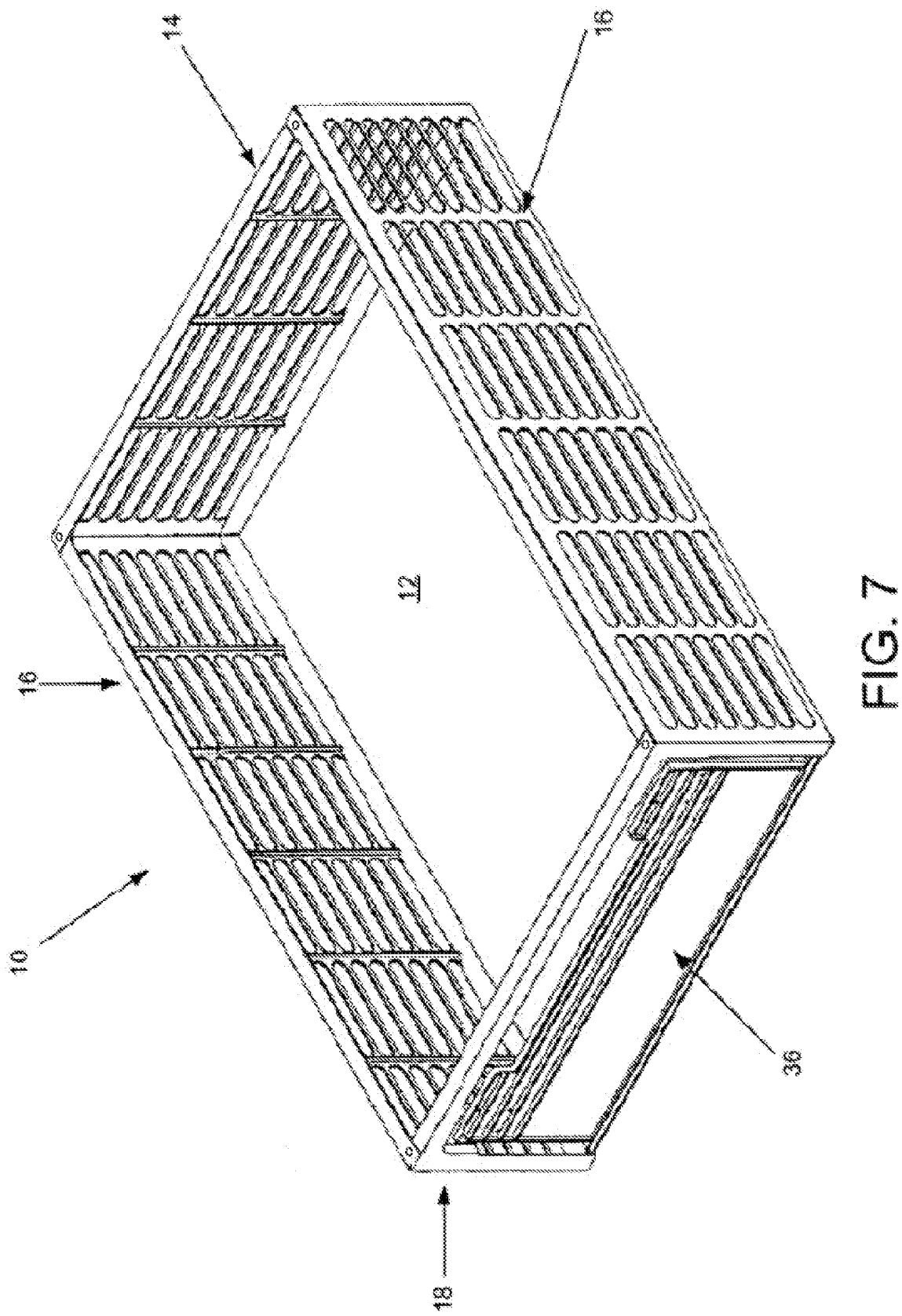
FIG. 7 illustrates an assembled improved poultry cage assembly in accordance with an exemplary embodiment of the invention.
Figure 8:
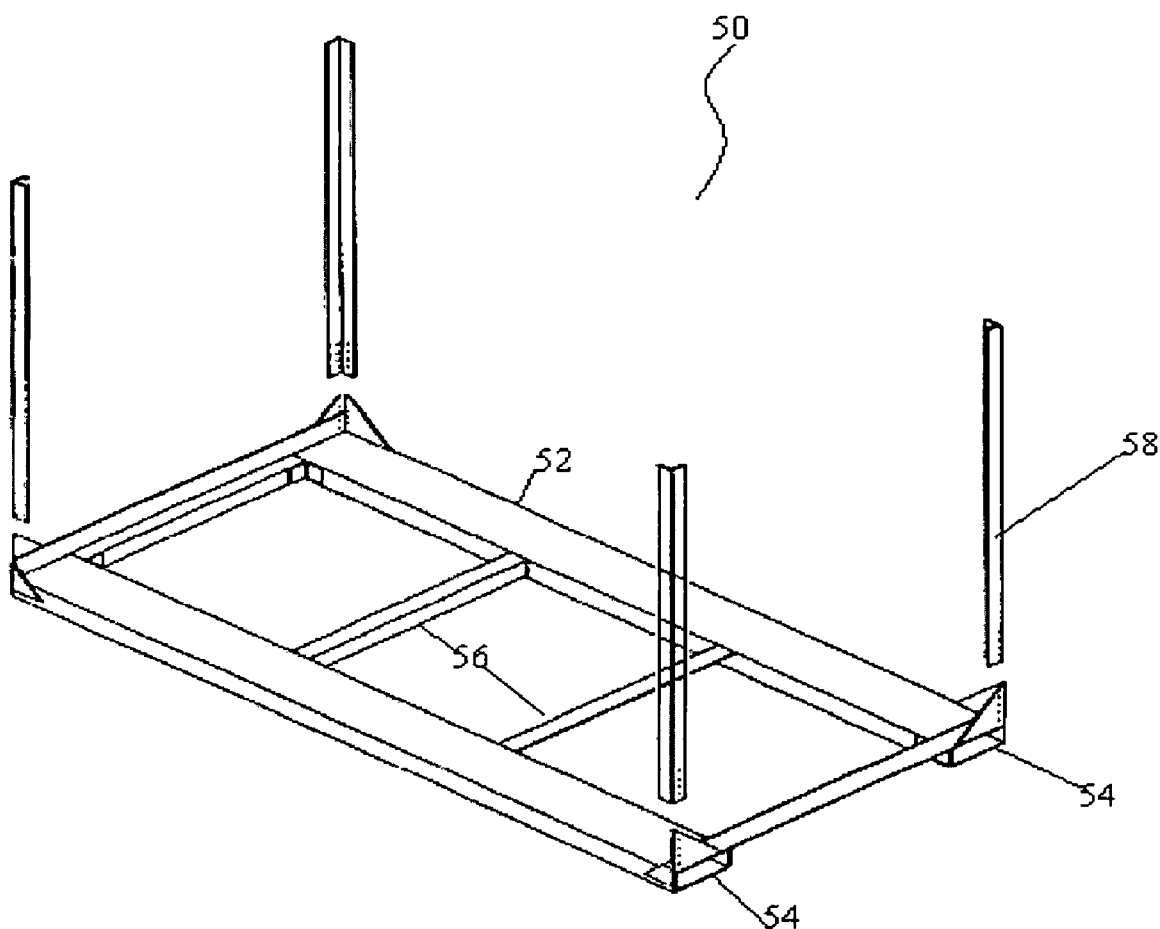
FIG. 8 illustrates a complete cage assembly including a plurality of improved poultry cages in accordance with an exemplary embodiment of the invention.

FIG. 6 illustrates a control strap 42 that is secured with a mechanical fastener 20 to the recessed plate 32 and to the door 36. The control strap 42 is designed to allow the door 36 to open to a position that is parallel to the floor panel 12 but prevent the door 36 from opening past the floor panel 12. For example, if one or more cages are stacked the doors 36 from the upper cages would be prevented from blocking the openings of lower cages by the control strap 42. In an exemplary embodiment, the door strap 42 may be constructed of nylon or another suitable polymer such as polypropylene or polyester.

FIG. 5 illustrates the door 36, which includes a magnetically attractive plate 38 that is disposed on the upper extremities of the door 36. The door 36 also includes a metal hinge 40, such as, for example and not limitation, a piano hinge, that is disposed on the lower longitudinal plane of the door 36 and is also affixed to the floor panel 12 by mechanical fasteners. The hinge 40 is mounted to the door 36 and the floor panel 12 in a manner that the hinge knuckle is on the underside to prevent obstructing the removal of poultry when the assembled cage. The mechanical fasteners used to secure the hinge 40 are designed to break-a-way under stress to prevent damage to the door 36 or the floor panel 12. The door 36 includes a series of longitudinal ribs at the top extremity that increases the structural integrity of the door 36 and reduces bowing of the door 36 under stress. The upper corners of the door 38 include magnetically attractive plates 38 that are designed to align with the magnet 34 when the door is in a closed position. The attractive force between the magnetically attractive plate 38 and the magnet 34 is designed to be overcome by the weight of a plurality of birds pressing against the door 36 when the cage 10 is in a tilted position.

Figure 9:
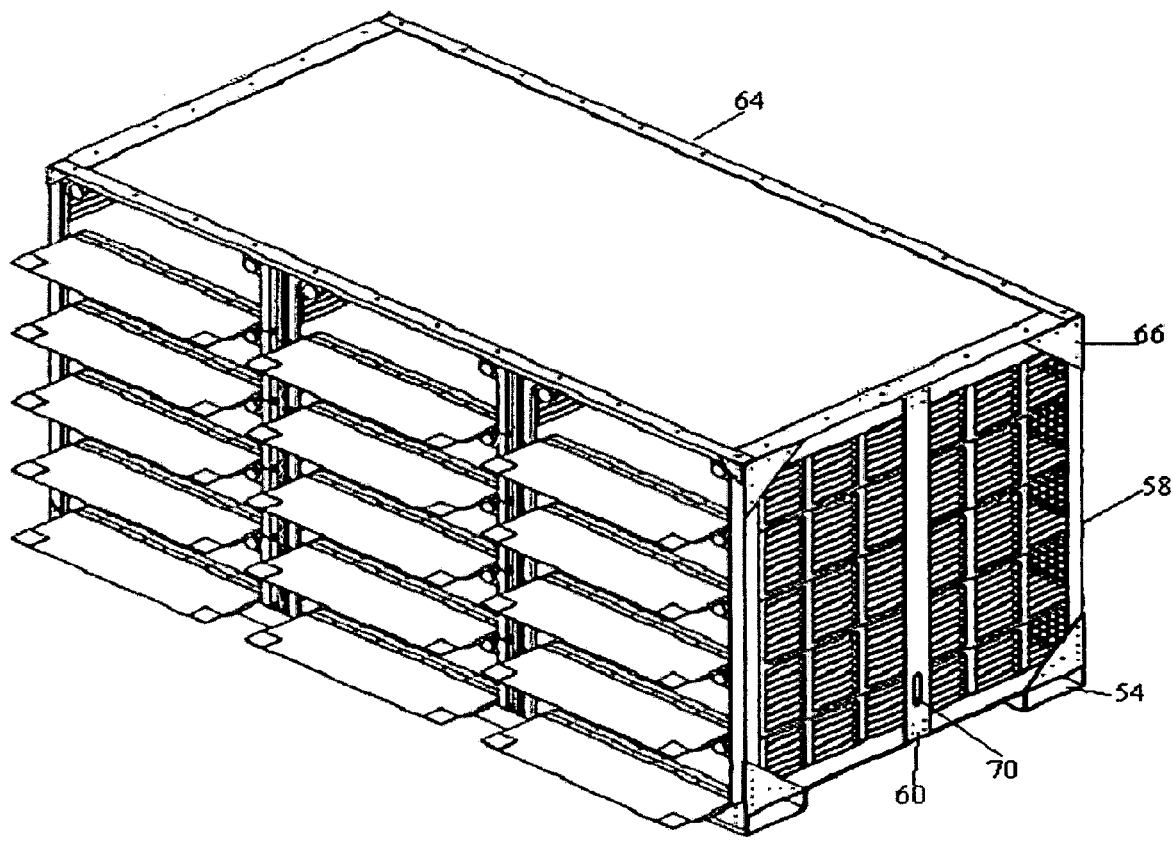
FIG. 9 illustrates a pallet assembly including a plurality of improved poultry cages in accordance with an exemplary embodiment of the invention.

Continuing with reference to FIG. 9, the assembled improved poultry cages 10 are stacked on top of each other to the desired height. The stack of improved poultry cages 10 is positioned to fill the metal frame 50 to the desired number of layers and corner posts 58 are inserted between the vertical posts of the compartment stacks. Pallet corner gussets 66 and corner posts 58 may be fastened together with rivets, or other suitable attachment means.

The poultry cage transportation assembly also includes a roof assembly that is constructed of a metal frame 64 that surrounds the top of the stacks of improved poultry cages 10. The metal frame 64 members may be attached to each other at the corner intersections by welding and the four corners may reinforced with corner gussets 66 welded or riveted to the outside of the roof frame assembly. In another exemplary embodiment, the metal frame 50 forms the base of a knockdown cage assembly. The knock down cage assembly allows a plurality of un-assembled improved poultry cages 10 to be shipped along with the metal frame 50 and the roof assembly. Shipping the improved poultry cages 10 in an un-assembled form greatly reduces the space required for shipping and increases the number of improved poultry cages 10 that may be included in a single shipment. The corner posts 58 are assembled on the pallet stretchers along with the required number of collapsed improved poultry cages 10. The roof assembly is positioned to be congruent on the pallet. The assembly is secured with dunnage and strapping for storage or shipping to customers for customer assembly.

The roof assembly consists of an angle frame that incorporates corner gussets, stacking alignment angle cleats and a fiberglass reinforced polymer roof such as ABS, polypropylene, polyester or other polymers with ultraviolet protection. The polymer panel is a poor conductor of heat which is very important on long transport trips in very hot weather. The two sleeves and end stretchers form a base which incorporate gussets on each corner and provide a pallet for the stack of compartments. Once the compartments are in place the corner posts are inserted behind the corner gussets and secured. The roof assembly is lowered in place with the corner posts inserted behind the roof corner gussets and fastened in place.

Figure 10:
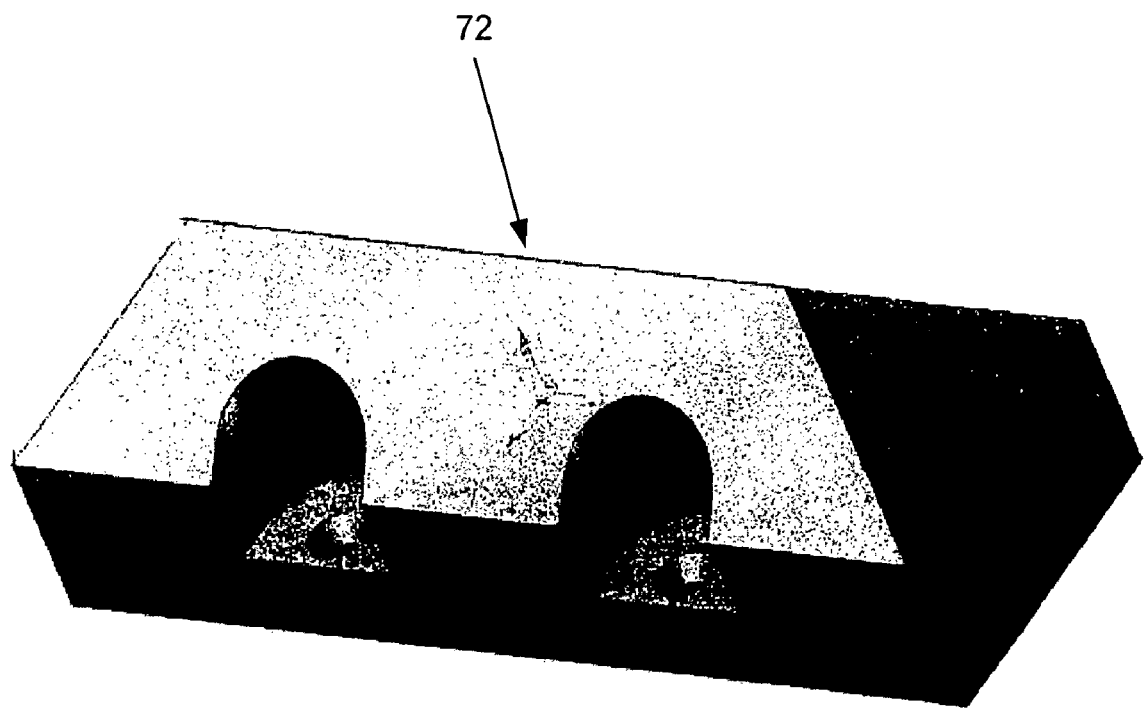
FIG. 10 illustrates a two-axis beveled cleat in accordance with an exemplary embodiment of the invention.
Figure 11:
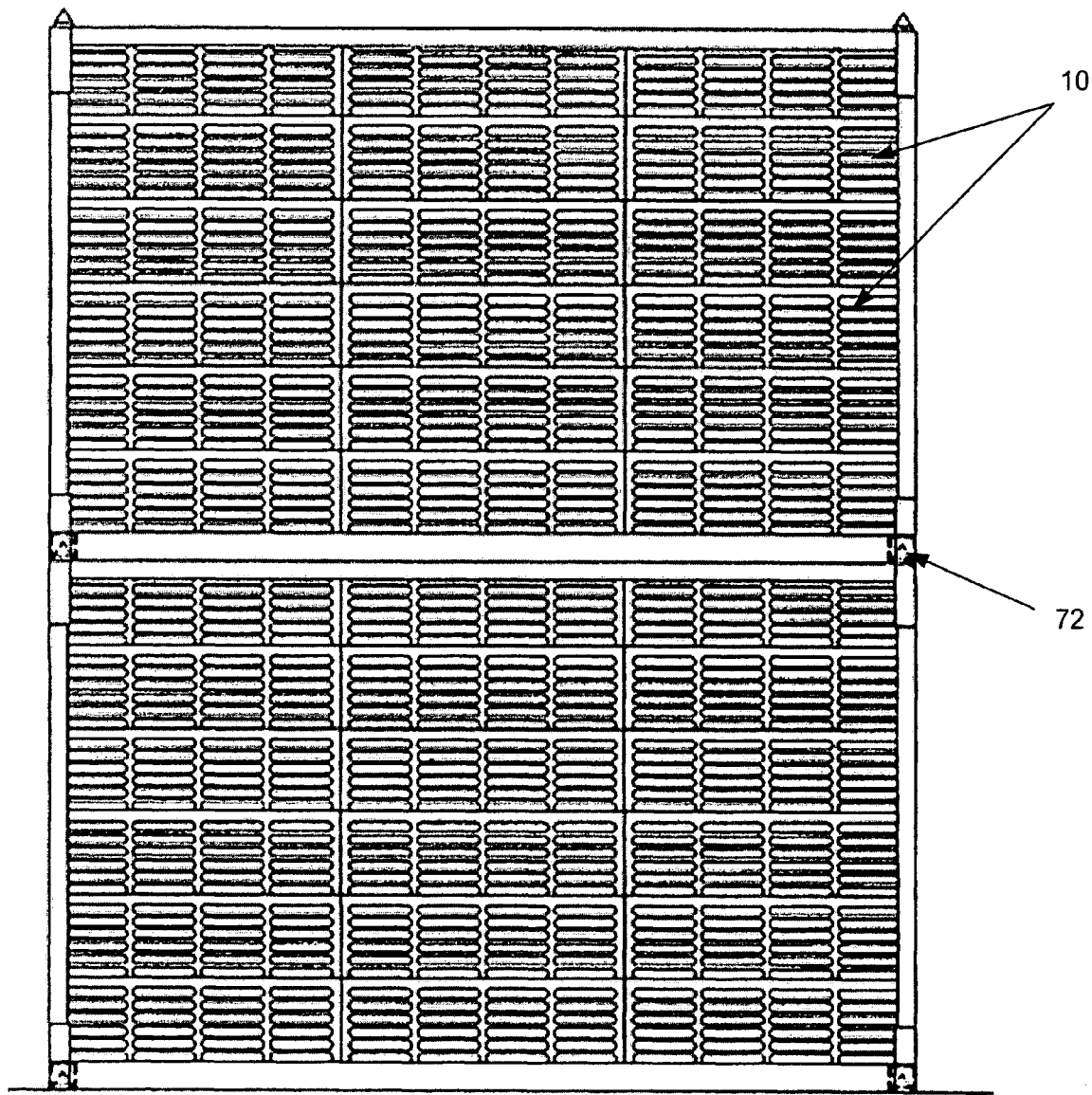
FIG. 11 illustrates the two-axis beveled cleat located to interface the interior walls of the pallet stretcher channel in accordance with an exemplary embodiment of the invention.

FIG. 10 illustrates a two-axis beveled cleat 72 that is mounted in pairs on the metal roof end rail and positioned to interface the interior walls of the pallet fork sleeve stretcher channel to provide longitudinal alignment of the top cage in a two cage stack on the transport trailer. The angle cleats 72 assure alignment both longitudinal and transverse when the groups of poultry cages 10 are stacked two high during shipment. FIG. 11, illustrates the two-axis beveled cleat 72 being used between two groups of stacked poultry cages 10.

Figure 12:
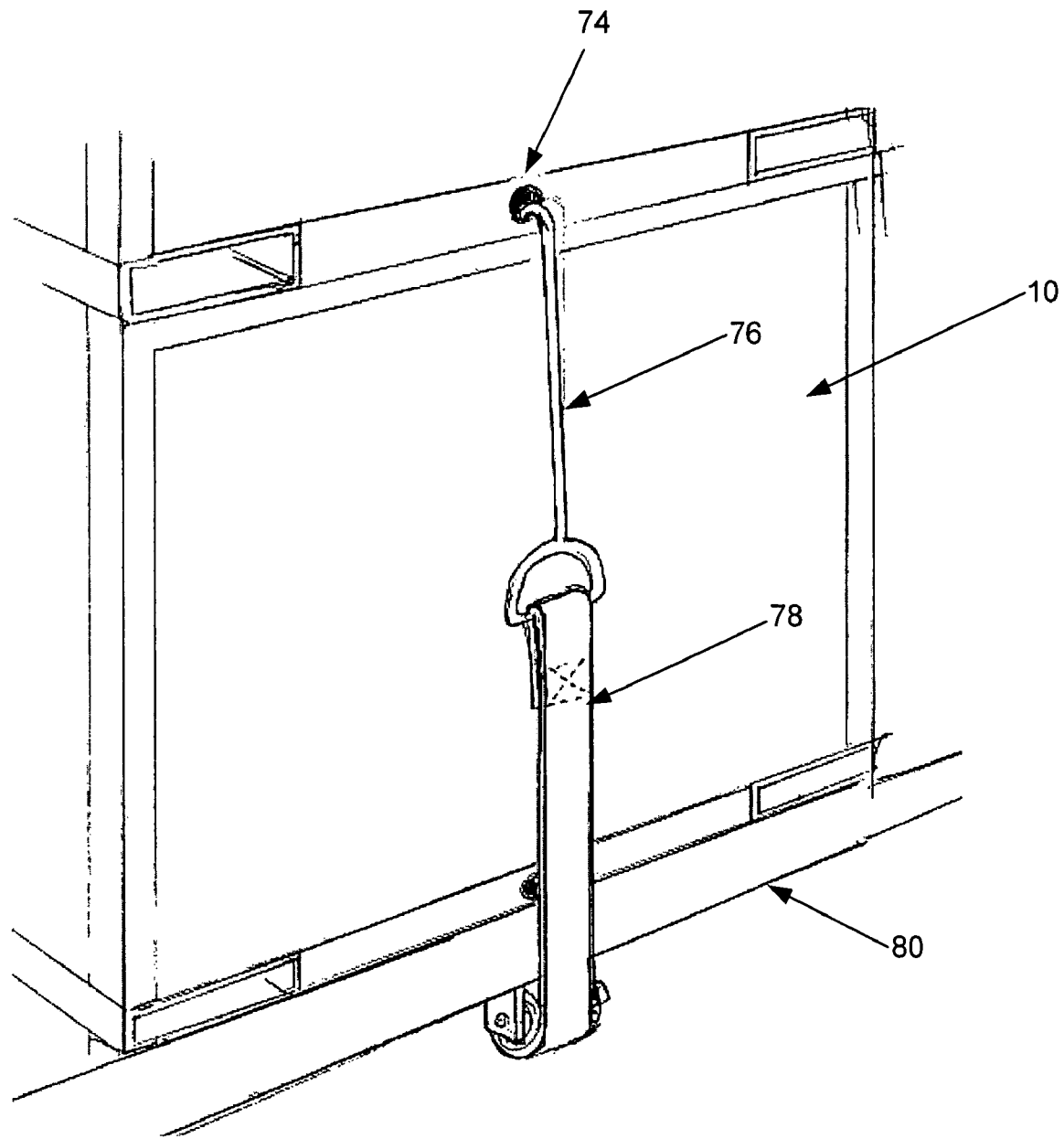
FIG. 12 illustrates a binding system used to arrest movement of the poultry cages in accordance with an exemplary embodiment of the invention.
Figure 13:
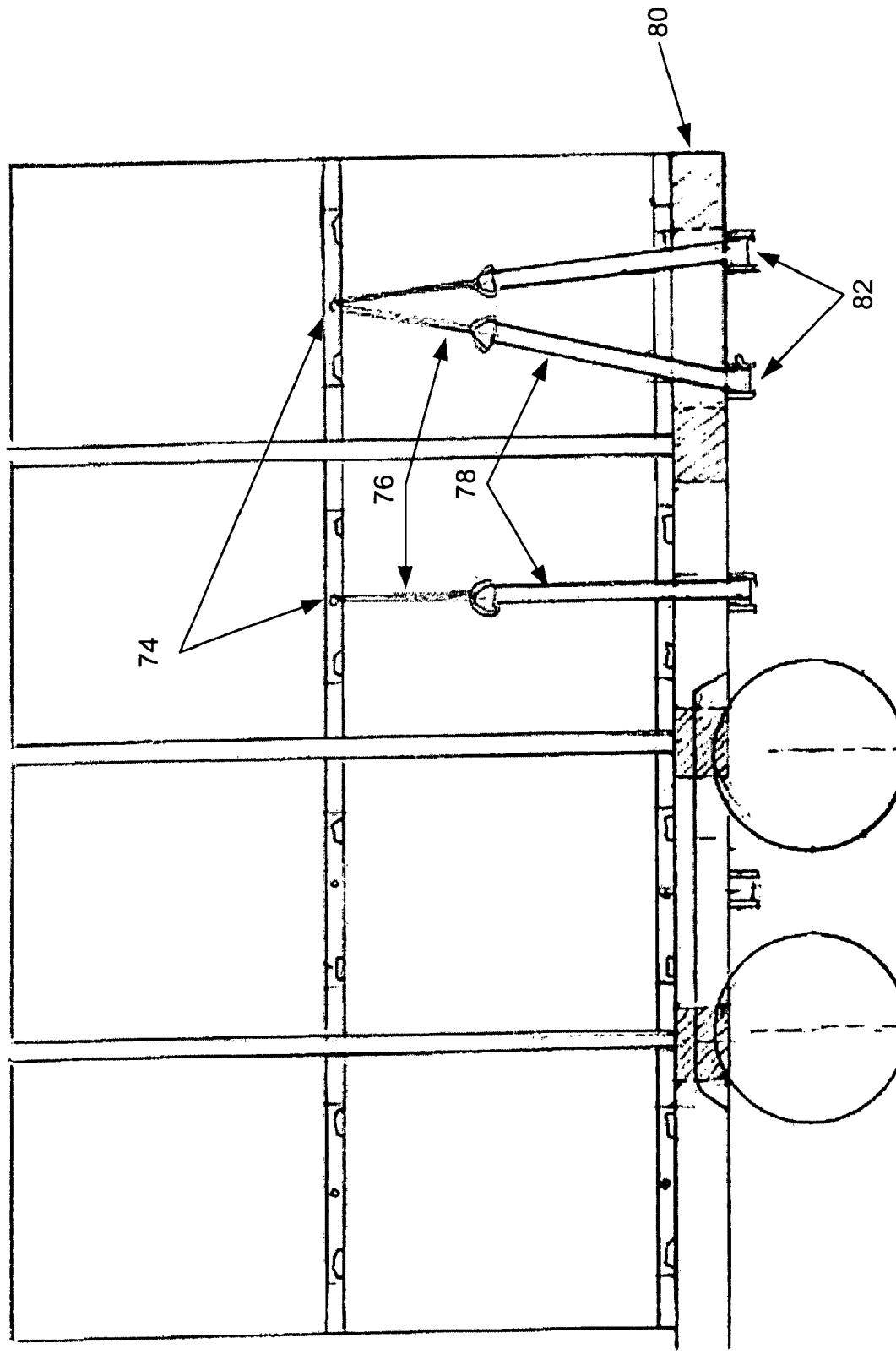
FIG. 13 illustrates a binding arrangement of a cage stack when positioned on the transport trailer in accordance with an exemplary embodiment of the invention.

Turning now to FIGS. 12 and 13, a binding system used to arrest movement of the poultry cages 10 is illustrated. The outer face of the fork sleeve channel incorporates a circular orifice 74 located in the channel's mid-point, which receives a metal rod binder hook 76 which is attached to a cloth belt 78 with a metal bracket fastened to the hook's "D" handle. The device is used to secure the cage stack to the transport trailer with a belt winch mounted to the under side of the transport trailer's outer longitudinal frame 80. The end stack of cages located on the rear extremity of the transport trailer is secured with two binder devices and belt winches 82 spaced to provide securing force at opposing angles to each other.

Removing the cages from the trailer deck requires relieving the tension on the trailer mounted belt winch 82 a sufficient amount to un-hook the metal rod hook 76 from the upper cage stretcher orifice. As no spring is incorporated, reliving the belt tension is safe to the operator and the tension in a truck roll-over is secured by the tinsel strength of the belt and winch mounting rather than the compressive strength of an incorporated spring as is the case in the conventional binding device.

To achieve the required weight reduction to make the integrated transport system viable, a significant amount of weight must be eliminated in the conventional light-weight aluminum trailer. Accordingly, disclosed herein is a trailer structure that accomplishes this goal. To accomplish the economic goals of the transport system the trailer must accommodate twenty-four cages light weight cages with a foot print four feet by eight feet and not exceed the legal length mandated by the states where the transport system is used.

Figure 14:
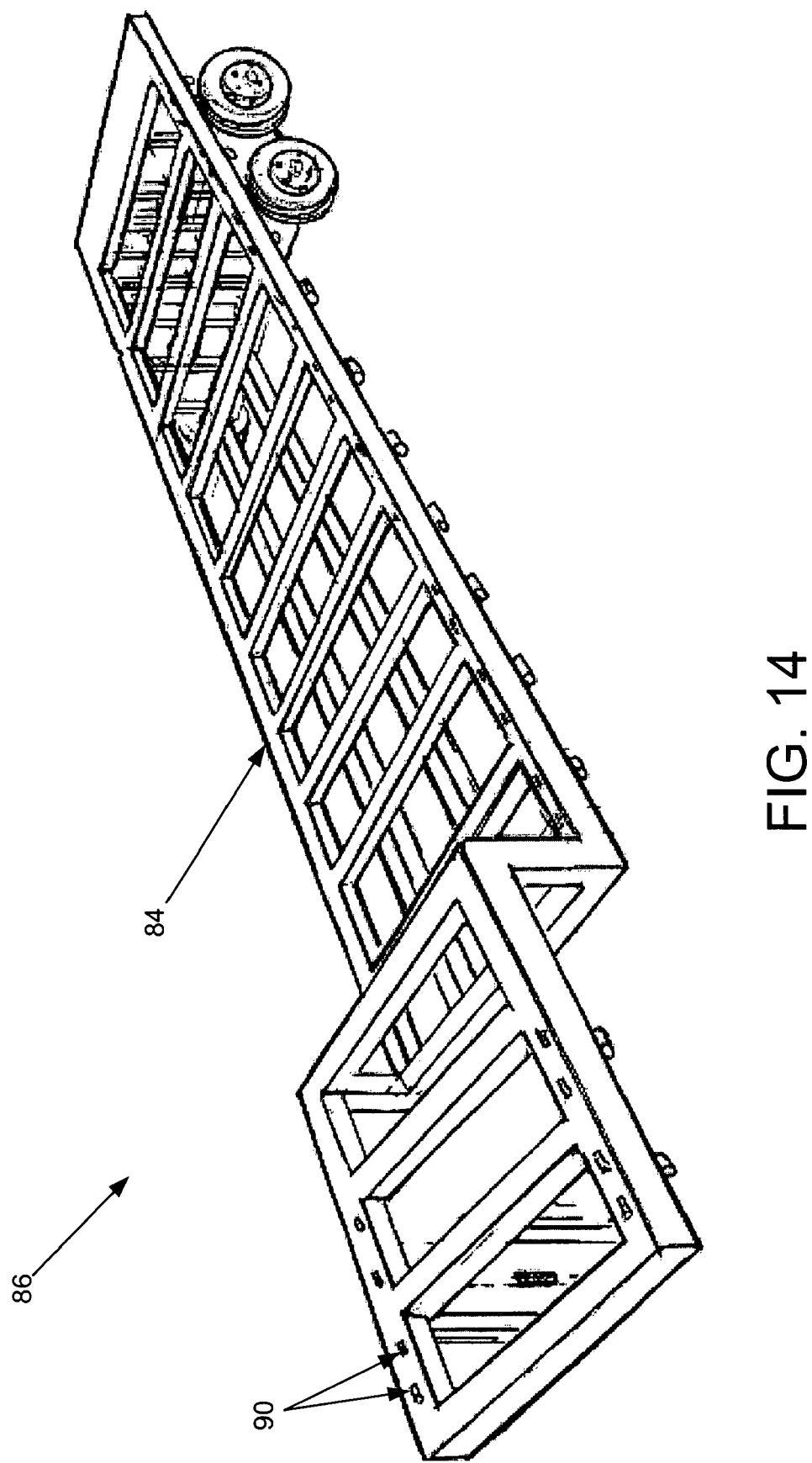
FIG. 14 illustrates a structure of the light-weight trailer in accordance with an exemplary embodiment of the invention.
Figure 15:
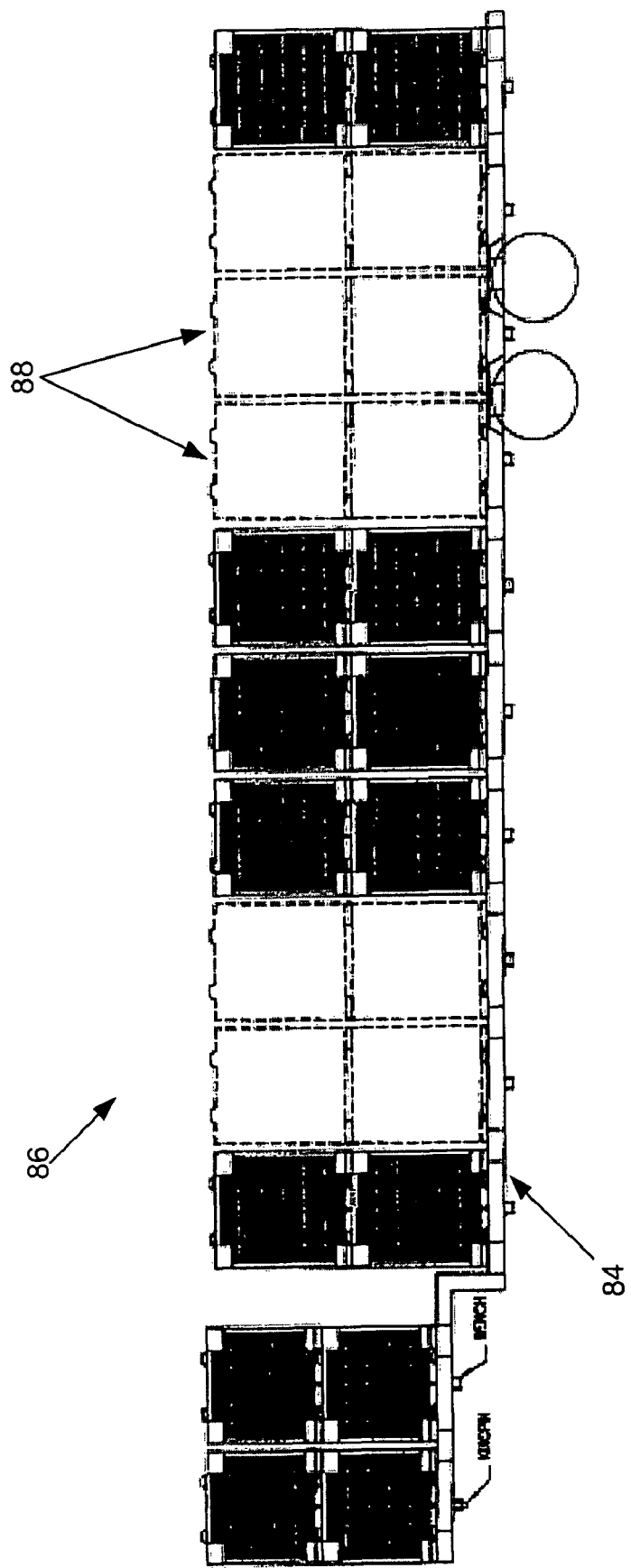
FIG. 15 illustrates the cage orientation on the light-weight trailer frame structure in accordance with an exemplary embodiment of the invention.

Turning now to FIGS. 14 and 15, a frame structure 84 of a light-weight trailer 86 in accordance with exemplary embodiments of the invention is illustrated. The weight reduction of the trailer is accomplished by constructing a frame structure 84 that is configured expressly for supporting the pallets of the cage stacks and removing the un-necessary remaining deck structure. The frame structure 84 is designed to support an evenly loaded trailer rather than a conventional trailer designed for worst case support of a large maximum weight located in a central location of the trailer deck.

Proper loading of the poultry cages 10 on the light-weight trailer 86 will prevent cage stacks being inadequately supported and/or exceeding the legal length of the trailer. To insure proper alignment and spacing of the poultry cage pallets 88 on the transverse and longitudinal deck beams, the longitudinal trailer frame beam incorporates a series of two-axis beveled cleats 90. The two-axis beveled cleats 90 are positioned to insure the poultry cage stacks are properly aligned fore and aft on the frame structure 84 and spaced with a uniform "air space" between poultry cage stacks.

In exemplary embodiments, the poultry cage transportation assembly including the stack of improved poultry cages 10 provides a reduced poultry cage weight which permits greater payload and fuel economy for transportation of poultry. Furthermore, the improved poultry cages 10 provide additional savings by breaking down for transport when not used to transport live poultry. Additionally, the design of the poultry cage transportation assembly produces a low heat transfer from the improved poultry cages to the birds stored in the cages resulting in fewer birds dying during transportation.

Figure 16:
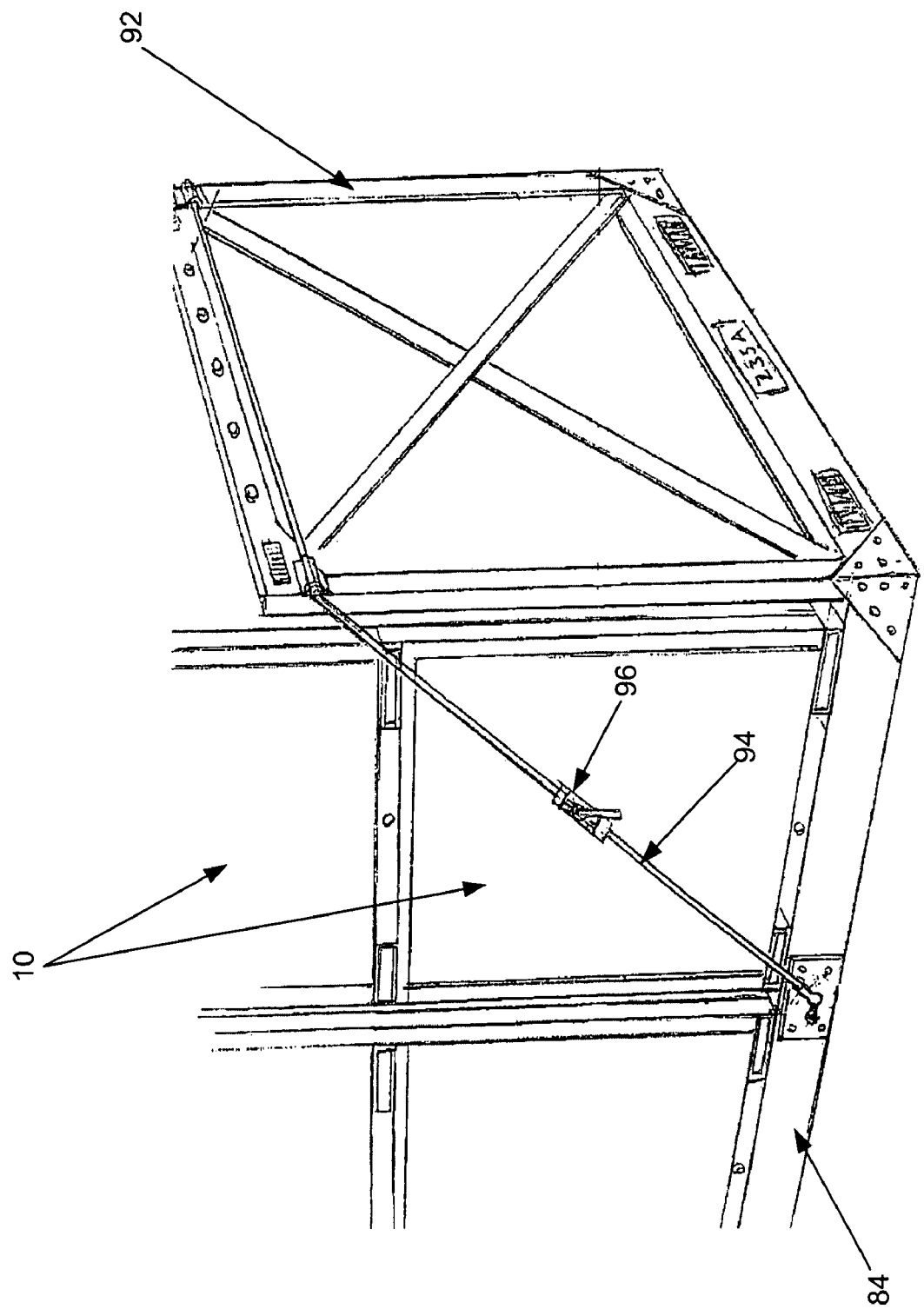
FIG. 16 illustrates a portion of a light-weight trailer frame structure in accordance with an exemplary embodiment of the invention.

The last stack of two cages on the rear extremity of the light-weight trailer may pose a danger to vehicles and persons following the trailer during transit should the primary binding system fail. A safety frame 92 shown in FIG. 16 is designed to provide a fail-safe mechanism to ensure the cages 10 remain secured to the light-weight trailer 86. The safety frame 92 is the width of the frame structure 84 and extends sufficiently high to prevent the top cage in the stack from falling. The safety frame 92 is retained in the perpendicular position with an attachment member 94 affixed to the top of the safety frame 92 at one end and to the frame structure 84 at the other end. Tension on the attachment member 94 may be provided by a toggle 96 located on the midpoint of the restraining member. Furthermore, this safety frame 92 may also be provided in the front of the trailer to prevent poultry cages from impacting the trailer cab.

While the invention has been discussed with reference to exemplary embodiments, it will be apparent to those skilled in the art that many modifications, additions, and deletions can be made therein without departing from the spirit and scope of the invention and its equivalents, as set forth in the following claims.

What is claimed is:

1. A poultry cage assembly comprising:
    a plurality of improved poultry cages each comprising:
        a substantially flat floor panel;
        four wall panels, each with a bottom end and a top end, each bottom end comprising a groove for detachably coupling each wall panel to the floor panel with a tongue and groove joint;
        a substantially smooth protrusion extending across the top edge of, and perpendicular to, each of the wall panels such that at least as portion of the protrusions overlap when the wall panels are coupled to the floor panel; and
        a mechanical fastener operable for detachably coupling each protrusion to each adjacent protrusion where they overlap; and
    a substantially smooth, flat roof panel for enclosing the top of the topmost of the plurality of improved poultry cages;
    wherein the groove on the bottom of each wall panel is open on three or more sides;
    wherein the floor panel of each improved poultry cage acts as a roof panel for each adjacent, lower improved poultry cage; and
    wherein the floor panel, the wall panels, the protrusions, and the roof are constructed of a unitary and durable polymer material.

2. The poultry cage assembly of claim 1, wherein one or more of four wall panels comprises a door frame and a door attached to the floor panel.

3. The poultry cage assembly of claim 2, wherein the door includes an attractive material and the wall panel includes a magnet disposed such that the attractive material is proximate to the magnet when the door is in a closed position.

4. The poultry cage assembly of claim 2, wherein the door is attached to the floor panel with a single, continuous hinge.

5. The poultry cage assembly of claim 2, wherein the door is attached to the floor panel with a metal hinge.

6. The poultry cage assembly of claim 1, wherein one or more of the four wall panels comprises a plurality of air vents operable for increasing air flow in the improved poultry cage.

7. The poultry cage assembly of claim 1, wherein the tongue and groove joint allows the improved poultry cage to collapse into a position where the wall panels are substantially coplanar with the floor panel.

8. The poultry cage assembly of claim 1, wherein only the corners of the protrusions overlap.

9. The poultry cage assembly of claim 1, wherein a first wall panel on each of the plurality of improved poultry cages includes a door comprising:

a single, continuous hinge to pivotally couple the door to one of the wall panel or the floor panel; and a magnetic catch to hold the door in a closed position;

wherein the magnetic catch is configured to be overcome by the weight of a plurality of birds pressing against the door when the cage is in a tilted position to enable the door to move to an open position.

* * * * *